United States Patent
Biddiscombe

(10) Patent No.: US 7,553,528 B1
(45) Date of Patent: Jun. 30, 2009

(54) POLYMERIC FILMS

(75) Inventor: Helen Biddiscombe, Bridgwater (GB)

(73) Assignee: Hoechst Trespaphan GmbH (DE)

( * ) Notice: Subject to any disclaimer, the term of this patent is extended or adjusted under 35 U.S.C. 154(b) by 0 days.

(21) Appl. No.: 09/763,723

(22) PCT Filed: Aug. 26, 1999

(86) PCT No.: PCT/EP99/06272

§ 371 (c)(1),
(2), (4) Date: Feb. 27, 2001

(87) PCT Pub. No.: WO00/12288

PCT Pub. Date: Mar. 9, 2000

(30) Foreign Application Priority Data

Aug. 27, 1998 (GB) .................... 9818560.6

(51) Int. Cl.
*B32B 27/06* (2006.01)
(52) U.S. Cl. ............. 428/35.7; 428/36.9; 428/36.91; 428/36.92; 428/349
(58) Field of Classification Search ........... 428/35.7, 428/36.9, 36.91, 36.92, 349
See application file for complete search history.

(56) References Cited

U.S. PATENT DOCUMENTS

| 4,892,779 | A | * | 1/1990 | Leatherman et al. ........ 428/220 |
| 5,078,817 | A | * | 1/1992 | Takagaki ................ 156/272.2 |
| 5,223,315 | A | * | 6/1993 | Katsura et al. ........... 428/36.92 |
| 5,332,542 | A | | 7/1994 | Yamanaka et al. |
| 5,435,963 | A | * | 7/1995 | Rackovan et al. ...... 156/244.11 |
| 5,527,601 | A | * | 6/1996 | Crighton et al. ......... 428/316.6 |
| 5,733,615 | A | * | 3/1998 | Rackovan et al. ........ 428/307.3 |
| 5,868,986 | A | * | 2/1999 | Foulkes ................... 264/259 |
| 6,004,682 | A | * | 12/1999 | Rackovan et al. ......... 428/515 |
| 6,150,013 | A | * | 11/2000 | Balaji et al. ............. 428/220 |
| 6,228,316 | B1 | * | 5/2001 | Moseley, III ............ 264/509 |
| 6,238,785 | B1 | * | 5/2001 | Kitamura et al. .......... 428/323 |
| 6,306,490 | B1 | * | 10/2001 | Biddiscombe ........... 428/315.5 |
| 6,444,301 | B1 | * | 9/2002 | Davidson et al. ........ 428/315.5 |
| 6,726,969 | B1 | * | 4/2004 | Balaji et al. ............. 428/35.7 |

FOREIGN PATENT DOCUMENTS

EP 0436044 A1 10/1991

* cited by examiner

*Primary Examiner*—Rena L Dye
*Assistant Examiner*—Walter B Aughenbaugh
(74) *Attorney, Agent, or Firm*—Dickinson Wright PLLC

(57) ABSTRACT

In-mold labelled, blow-molded articles formed from high density polyethylene, the labels being formed from biaxially oriented polypropylene based films having a shrinkage of at least 4% in both the machine and transverse directions as measured by the OPMA shrink test in which the film is suspended in an oven at 130° C. for a period of 10 minutes. The use of films with the specified shrinkage enables blistering and "orange peel" effects to be avoided when the blow-molding is carried out.

7 Claims, No Drawings

POLYMERIC FILMS

This invention concerns polymeric films and in particular the use of such films for the in-mold labelling of articles.

The in-mold labelling of articles, in which a label is incorporated into the surface of an article made from a polymeric material as the article is formed, is a well known technique. Many proposals have therefore been made concerning materials which can be used to form the articles, the materials of which the labels are formed, and the processing conditions under which the articles are formed and therefore labelling itself is effected.

Important factors in achieving satisfactory in-mold labelling are the ability of the label to adhere to the article which is being produced, and also the ability of the label to withstand the processing conditions which are encountered during the formation of the article itself. More particularly, in-mold labelling usually involves subjecting the labels to elevated temperatures for significant periods of time, this being particularly so with blow in-mold labelling where a polymeric parison is heated to a temperature at which it can be blown into the internal shape of a mold into which a label has previously been placed.

Using polyolefinic parisons, the labels used will themselves usually be formed from polyolefins, polypropylene and polyethylene being widely used as parison materials. Typically films used for the in-mold labelling of polyolefinic parisons are also made from polyolefins, polypropylene based films being widely proposed as being suitable for use in labelling articles made by blow molding either polypropylene or polyethylene parisons.

Typical of the problems encountered using polymeric films as labels for application to articles formed by in-mold blowing of polyolefin parisons using polyolefin films as labels are poor adhesion of the label to the articles, which can be manifest as blisters under the labels, and/or undesirable effects on the Labels themselves caused by the heat to which the polymeric films are subjected during formation of the articles, for example distortion and "orange peel" effects.

Many proposals have been made for overcoming such disadvantages, these usually depending on the nature of the polyolefin from which the parisons are made. It should also be appreciated that whereas little or no problems may be encountered using a particular polyolefin film to effect blow in-mold labelling of articles made from parisons of one polyolefin, the same film can suffer the disadvantages referred to above when used in blow in-mold labelling of articles made from parisons of another polyolefin. For example, if conventionally produced films consisting of either a solid or a voided polypropylene homopolymer core layer with two outer layers of a heat sealable propylene ethylene copolymer are used as in-mold labels for articles produced from polypropylene homopolymer parisons, satisfactory adhesion of the label to the article can, in general, be readily achieved. However, if the same film is used for the blow in-mold labelling of high density polyethylene articles, blistering and/or "orange peel" effects are obtained.

Hitherto proposed methods of overcoming such problems include the provision of layers in the label films themselves which have been suggested compensate for changes in the dimensions of the labels as a result of the heat applied to them by the heated parison, such layers being formed, for example, from foamed or voided polyolefins.

It has also been proposed to use adhesive layers to improve bonding of the labels to the articles. However, the use of such materials complicates production of the films used to produce the labels and it increases their cost.

It has also been proposed that films used to form labels for in-mold labelling should be as dimensionally stable as possible during the in-mold labelling process, which in effect means that as far as possible the films should not shrink during the in-mold labelling process.

According to the present invention there is provided an in-mold labelled, blow-molded article formed from high density polyethylene, the label being formed from a biaxially oriented polypropylene based film having a shrinkage of at least 4% in both the machine and transverse directions as measured by the OPMA shrink test in which the film is suspended in an oven at 130° C. for a period of 10 minutes.

Despite the widely held belief in the art that labels for in-mold labeling should have the minimum possible shrinkage at the temperatures to which they are exposed during in-mold labeling, the present invention is based on the use of films which shrink significantly at such temperatures. The minimum shrinkage in either the machine or transverse direction of the films should be at least 4% as measured by the OPMA shrink test. However, the shrinkages can be more. For example, the machine direction shrinkage can be at lest 5%, more particularly at least 6%, and as much as 7% or more, for example more than 8%. The transverse direction shrinkages can, for example, be at least 5%, more particularly at least 6%, and as much as 7% or more, for example more than 8%.

It is particularly surprising that both blistering and "orange peel" effects can be avoided by the use of films having shrinkages of greater than 4% as measured by the OPMA shrink test in both the machine and transverse directions. Furthermore, this surprising effect is observed both with polyolefin homopolymer based films having densities of not more than 0.69 $g/cm^3$, that is voided films, where "orange peel" effects have been a problem with films with shrinkages of less than 4%, and with films with densities of 0.8 $g/cm^3$ or more, where blister formation tends to occur with prior art films.

Films used for in-mold labelling in accordance with the present invention can have any of a wide variety of structures provided they have the required degree of shrinkage. However, they preferably have one or more layers of a propylene homopolymer with at least one outer layer of a heat sealable polymer, the heat sealable polymer being positioned next to the high density polyethylene when the article is blow molded so that the film adheres to the polyethylene of the article. Examples of heat sealable polymers which can be used include copolymers derived from two or more of ethylene, propylene, butene-1 and higher molecular weight a-olefins. Particularly preferred are copolymers of ethylene and propylene, and of ethylene, propylene and butene-1, such polymers preferably containing a major amount of units derived from propylene. When two heat sealable outer layers are present, they can be formed from the same or different polymeric materials.

In addition to at least one outer layer, the films can include at least one intermediate layer, the intermediate layer or layers preferably being formed from at least one polyolefin which can be a homopolymer but is preferably a copolymer derived from at least two different types of α-olefin and/or ethylene.

When an outer layer is present, the base layer and/or any intermediate layer which may be present preferably contains a hydrogenated hydrocarbon resin, it having been proposed hitherto to use such resins to increase the heat shrinkability of polyolefin films.

The polypropylene homopolymer layer or layers can contain a filler, and such fillers can act as a pigment which serves to opacify the layer or layers in which they are present, for example sub-micronic titanium dioxide, and/or they can act as a voiding agent, for example organic or inorganic fillers having particle sizes of at least 1 μm, e.g. particulate chalk and polymeric particles such as those formed from polyamides and polyesters.

When a filler is used which induces voiding, the films will usually have densities less than that for polypropylene homopolymers, for example less than 0.9 g/cm$^3$, and often less than 0.69 g/cm$^3$.

Films used as in-mold labels in accordance with the present invention will can contain additives used in the polymeric film art. Thus they will usually include an antiblock agent in one or both outer surfaces of the films, for example silica or a particulate polyamide, e.g. a nylon. Other additives can also be present in one or more of the layers, for example slip and antistatic agents. Examples of slip agents which can be present include long chain fatty acid amides, e.g. erucamide, and glycerol mono-esters of long chain fatty acids, e.g. glycerol monostearate. Examples of antistatic agents which can be used include polyethoxylated aliphatic amines such as bis-ethoxylated long chain aliphatic amines.

Films used in accordance with the present invention to form labels for blow molded articles can in essence be produced by known methods, subject to steps being taken to provide them with shrinkages in both the machine and transverse directions of at least 4%. Thus they will in general be produced by coextrusion of melts of the appropriate compositions through a die following which the coextrudate is biaxially oriented.

The biaxial orientation of the films can be effected either simultaneously, for example using the so-called "bubble" process, or sequentially, for example using heated rollers with different peripheral speeds to stretch the films in the direction of extrusion, and then using a stenter oven in which the films are stretched in the transverse direction. However, sequential stretching is generally preferred for reasons which will be explained.

In order to impart the desired degree of shrinkage to the films which are used in accordance with the present invention, it is important to anneal them at lower temperatures than are normally used to produce heat sealable packaging films. More particularly, it is generally preferred to effect sequential stretching of the films so that two annealing steps can be effected, the first after stretching of the films in the machine direction, and then a second after the films have been stretched in the transverse direction, this enabling greater control to be exercised over the respective degrees of shrinkage in the machine and transverse directions. Hence the preference for sequential rather simultaneous stretching, apart from the problems with the latter in producing films including voids in one or more of their layers.

Biaxial stretching of the films used in accordance with the present invention is preferably effected by a factor of from 3.5 to 7:1 in the machine direction and by from 5 to 10:1 in the transverse direction.

Annealing of the films following their being stretched in the machine direction is preferably effected at a temperature of less than 112° C., compared with conventional temperatures in excess of 115° C., this annealing being more preferably effected at temperatures of less than 105° C., and advantageously less than 100° C., particularly high shrinkages having been achieved at annealing temperatures of about 97° C. following stretching of the films in the machine direction, for example at temperatures of about 116° C. Annealing of the films in the machine direction is preferably effected by passing them over the surface of a plurality of rollers each with outer surfaces at the desired annealing temperature, the rollers each having substantially the same peripheral speeds so that the stretched length of the films in the machine direction is substantially maintained during the annealing process, i.e. there is substantially no stretching or relaxation of the film in the machine direction during the annealing process.

Annealing of the films following their being stretched in the transverse direction is preferably effected at a temperature of less than 145° C., compared with conventional temperatures of about 150 C, this annealing being more preferably effected at temperatures of less than 140° C., and advantageously less than 130° C., particularly high shrinkages in the transverse direction having been achieved at annealing temperatures of less than 120° C., and especially less than 120° C. following stretching of the films in the machine direction, for example at temperatures of less than 115° C., such as 105° C. Annealing of the films in the transverse direction is preferably effected by passing them over the surface of a number of rollers with outer surfaces at the desired annealing temperature whilst substantially maintaining the stretched width of the films, i.e. it is preferred that there is substantially no stretching or relaxation of the films in the transverse direction during the annealing process.

Once the films have been annealed following their having been biaxially stretched, at least one surface is preferably treated to increase its surface energy, for example by flame or corona discharge treatment, following which it is wound up.

The films can then be printed and cut to the shape and size required for the subsequent blow in-mold labelling process which can be effected in known manner.

Films used as labels in accordance with the present invention can be of a variety of thicknesses, but in general they should be at least 60 μm thick to facilitate processing in the in-mold labelling process itself. However, the films will not usually be more than 120 μm thick due to mechanical constraints in the formation of biaxially stretched films of such thicknesses.

The following Examples are given by way of illustration only.

EXAMPLE 1

A three layer polymeric web was by coextruding through a slot die a core layer consisting of a propylene homopolymer containing 6 wt % of titanium dioxide with a mean particle size of less than 1 μm as a pigment and 2.1 wt % of chalk with a mean particle size of 3 μm as a voiding agent, with two outer layers each consisting of a propylene/ethylene copolymer (4 wt % ethylene) on the surface of the core layer.

The web was cooled and it was then stretched 4.5 times in the direction of extrusion by passing it over heated rollers with differing peripheral speeds, the rollers being heated to a temperature of 116° C. The stretched film was then annealed by passing it over a series of annealing rollers with peripheral speeds substantially the same as that of the last of the rollers effecting stretching in the machine direction, the temperature of these annealing rollers being 97° C.

The mono-axially stretched web was then stretched 8 times in the transverse direction using a stenter oven at a temperature of 159° C., following which it was annealed at a temperature of 105° C. with substantially no change in the width of the film.

Thereafter, the film was corona discharge treated on the first outer layer and wound up. The film had a total thickness of 80 μm, the copolymer layer being 2.5 μm thick, the terpolymer layer being 2 μm thick, and the core layer being 76.5 μm thick.

The film had a shrinkage in the machine direction of 7.6% and in the transverse direction of 11.4% as measured by the OPMA shrink test in which the film is suspended in an oven at 130° C. for a period of 10 minutes. The density of the film was 0.8 g/cm$^3$.

The film was then cut into labels which were used to label blow molded containers by insertion of the film into the mold before the containers were formed. The labels of the resulting labelled containers showed neither an "orange peel" effect nor blistering.

EXAMPLE 2 (COMPARISON)

A three layered polymeric film was produced substantially as described in Example 1 except that annealing in the machine direction was effected at a temperature of 116° C. and in the transverse direction it was effected at a temperature of 150° C.

The film, which had layer thicknesses and a total thickness as given in Example 1, had a shrinkage of 4% in the machine direction and 0.7% in the transverse direction. The density of the film was 0.8 g/cm$^3$.

When used for in-mold labelling under substantially the same conditions used for the film of Example 1, blisters were noticed under the label even though there was no "orange peel" effect.

The invention claimed is:

1. An in-mold labeled, blow-molded article formed from high density polyethylene, the label being formed from a biaxially oriented polypropylene based voided film having a shrinkage of at least 4% in both the machine and transverse directions as measured by the OPMA shrink test, said film comprising:
    a base layer composed of a polypropylene homopolymer;
    a void-creating filler disposed in said polypropylene homopolymer, said filler being selected from the group consisting of chalk and organic polymers; and
    an outer layer,
    wherein said film has a density of less than 0.8 g/cm$^3$ and said outer layer comprises a heat sealable polymer.

2. An article according to claim 1, wherein the shrinkage of the film in the transverse direction is at least 5%.

3. An article according to claim 1, wherein the shrinkage of the film in the transverse direction is at least 6%.

4. An article according to claim 1, wherein the shrinkage of the film in the machine direction is at least 5%.

5. An article according to claim 1, wherein the shrinkage of the film in the machine direction is at least 6%.

6. An article according to claim 1, wherein the base layer contains a hydrogenated hydrocarbon resin.

7. An article according to claim 1, wherein the film comprises at least one intermediate polyolefin layer on the base layer and an outer layer on the intermediate layer, said base layer and said intermediate layer containing a hydrogenated hydrocarbon resin.

* * * * *

UNITED STATES PATENT AND TRADEMARK OFFICE
CERTIFICATE OF CORRECTION

| | | |
|---|---|---|
| PATENT NO. | : 7,553,528 B1 | Page 1 of 1 |
| APPLICATION NO. | : 09/763723 | |
| DATED | : June 30, 2009 | |
| INVENTOR(S) | : Helen Biddiscombe | |

It is certified that error appears in the above-identified patent and that said Letters Patent is hereby corrected as shown below:

In The Specification:

Column 1, Line 6, should read as follows: -- porated into the surface of an article made from a polymeric --

Column 1, Line 37, should read as follows: -- the labels themselves caused by the heat to which the poly- --

Signed and Sealed this

Twenty-third Day of February, 2010

David J. Kappos
*Director of the United States Patent and Trademark Office*